United States Patent [19]
Katz

[11] Patent Number: 5,336,848
[45] Date of Patent: * Aug. 9, 1994

[54] LAP-TOP COMPUTER OPERATORS PROTECTIVE DEVICE

[76] Inventor: Joseph M. Katz, 11 Meadon Rd., Old Wesbury, N.Y. 11568

[*] Notice: The portion of the term of this patent subsequent to Jul. 28, 2009 has been disclaimed.

[21] Appl. No.: 110,922

[22] Filed: Aug. 24, 1993

Related U.S. Application Data

[63] Continuation-in-part of Ser. No. 708,222, May 31, 1991, Pat. No. 5,134,245.

[51] Int. Cl.⁵ .............................. H05K 9/00
[52] U.S. Cl. ........................... 174/35 R; 174/35 GC; 174/35 MS; 364/708.1
[58] Field of Search ............... 206/305, 328, 334, 320, 206/576, 577; 364/708.1; 174/35 R, 35 GC, 35 MS

[56] References Cited

U.S. PATENT DOCUMENTS

| | | | |
|---|---|---|---|
| 1,776,134 | 9/1930 | Scruby et al. | 206/557 |
| 4,002,233 | 1/1977 | Page, Jr. et al. | 206/577 |
| 4,218,578 | 8/1980 | Olschewski et al. | 174/35 R |
| 4,464,540 | 8/1984 | Reeder | 174/35 C |
| 4,864,077 | 9/1989 | Wadell | 174/35 R |
| 4,910,090 | 3/1990 | Kuhlman et al. | 428/469 |
| 4,919,037 | 4/1990 | Mitchell | 89/36.05 |
| 5,130,500 | 7/1992 | Murakami et al. | 178/19 |
| 5,134,245 | 7/1992 | Katz | 174/35 R |
| 5,164,542 | 11/1992 | Hart | 174/35 MS |
| 5,182,155 | 1/1993 | Roe | 428/116 |

*Primary Examiner*—Leo P. Picard
*Assistant Examiner*—Christopher Horgan

[57] ABSTRACT

A low cost non-electric device to afford some protection to the operators of Lap-top computers, Notebook computers and portable computers from the electromagnetic radiation fields emitted therefrom and to afford a comfortable cushion to rest the computer upon as well as providing a cushion made of rated armed threat level ballistic protective materials affixed thereto to afford some protection against armed threats.

6 Claims, 6 Drawing Sheets

LAP-TOP COMPUTER OPERATORS PROTECTIVE DEVICE

This is a continuation-in-part application of Ser. No. 708,222, filed May 31, 1991, on U.S. Pat. No. 5,134,245 to expand on the uses that apply to the invention and to be responsive to the variety of accessories and differences in sizes of the computers and to adjust the invention to fit computer manufacturing companies specifications, to broaden the versatility of the invention, to provide a means to use the latest of material technology in this fast moving and expanding field of electro-magnetic radiation shielding and the alternate uses of the invention for a combination of purposes and to provide a method to protect the computer user from a ballistic armed threat encounter.

BACKGROUND OF THE INVENTION

1. Field of the Invention

The invention relates to providing some protection to the operators of Lap-top, Note-Book and portable computers from the electro-magnetic fields radiation emitted therefrom and to provide a comfortable cushion when the computer is being used on the lap. When used on other than the lap the cushion will serve as a noise absorber and slippage deterrent. When afffixed with the rated armed threat level ballistic protection cushion it will also serve as a protection against armed threats.

2. Description of the Prior Art

Lap-Top Computer Operators Protective Device by Joseph M. Katz filed May 31, 1991, Ser. No. 708,222, U.S. Pat. No. 5,134,245.

SUMMARY OF THE INVENTION.

There is much concern throughout the world that electro-magnetic fields radiation from the Lap-Top, Note-book and portable computers can cause genetic defects, cancer and other bodily harms when the computer is in close contact to the body.

The Lap-Top, Notebook and portable computers have become very popular with executives and travelling business persons since they can sit in an airplane seat, an automobile, a train and the like, put the computer on their lap and utilize travelling time to get work done, play games or to otherwise amuse themselves to pass time away. Furthermore, there is a known armed threat to travelling executives and this invention's rated level armed threat ballistic shield cushion would afford instantaneous additional protection from armed threat. Also, since the computer is small and compact, many use it as a work station. However, since the screen is small and the writing on it is dull, the operators have a tendency to bend over close to the computer and expose themselves to emitted electro-magnetic field radiation. Also, when in use at a work station such as at a bank, payroll department and other vulnerable offices open to the public and an armed threat incident occurs, the rated level armed threat ballistic protection cushion embodied in the invention can be used as an instantaneous body protective device.

The Lap-top, Notebook and portable computers, being electric, emit electro-magnetic fields radiation. The fact that being placed on the lap and in close contact to critical genetic and bodily organs, the danger is apparent. In many cases the computer operator crosses their legs to control slippage of the computer. This is another bodily danger since leg crossing with the computer weight can cause arterial damage. Furthermore, the weight of the computer causes uncomfortableness. Also, at the workstation, danger from close body contact is a hazard.

Because of the hazards and uncomfortableness this device was invented. Its purpose is to provide a one piece light weight portable unit with a comfortable cushion to rest the computer upon as well as to afford some protection against electro-magnetic fields radiation so that they by-pass the computer operator, thereby providing some protection to the genetic and bodily organs. Also, with the cushion being of rated threat level ballistic protection material it will provide an instantaneous shield against an armed threat. Portability, light weight, protection, comfort and separability are all functions of the invention.

The invention is simple to use. It is manufactured into a single one piece unit consisting of lightweight material, box-like tray, open at the top, electro-magnetic radiation shielding with grounding wire plug, grounding wires with connections and plugs and a cushion attached to the bottom.

The open tray is made with a firm material. The material used would depend upon the model manufactured. Some models would be in firm unbendable material such as in metal or plastic, other models would require bendable material such as in plastic or metal, or a combination of both firm and bendable material. Some models would have hinged sides. Some models will have removable sides, some models will have sides with removable plugs. Some models will have a rated armed threat level ballistic protection shield cushion. The size of the invention would be manufactured to conform to the measurements of the computer manufacturers specifications.

To build the invention a tray would be formed having a flat base with 4 upright side walls all made from metal or plastics or a combination thereof. The rear wall would be higher than the front wall. The side walls would taper downward from the rear to the front where they would meet level with the top and bottom of the front and rear walls and the walls would be affixed to the upper side of the flat tray. An electro-magnetic radiation shielding would be affixed under the bottom of the tray and in some models this shielding would extend between the walls. A horizontal cushion would be affixed to the electro-magnetic radiation shielding and under the bottom of the tray to form a one piece combined unit. A grounding connection would be attached to the electro-magnetic radiation shielding with a receptive plug to accommodate a grounding wire with grounding connections. The electro-magnetic radiation shielding would be made from aluminum, copper, steel, carbon or combinations thereof, fabrics, plastics, powders, polymers or other tested materials that come into the marketplace that perform electro-magnetic radiation shielding, for example, Magnetic Shield Corp, Bensonville, Ill. manufactures an electro-magnetic radiation shielding CO-NETIC (an annealed alloy). In some models of the invention, the electro-magnetic shielding would also be affixed to the upright walls as well as to the bottom of the tray. In those models the electro-magnetic shielding would be affixed under the bottom of the tray and run up between the side walls, the walls would be doubled to cover the shielding, thereby strengthening the sides and protecting the shielding. To provide versatility and accommodate various methods of use of the computers as well as allow accessory attachments, various models would be built, such as models having upright walls that fold over to accommodate ease of attachment of accessories and other models that have walls that have openings with removable plugs to accommodate insertion of accessories. The plugs would be made of the same materials as the wall with overlapping on the inside and outside. The outside overlap would be separable from the plug and fastened with a screw to provide a means to remove and reinstall the plug. Electro-magnetic radiation shielding would be affixed within the plug to prevent radiation leakage. Other models would have removable and replaceable walls which would slide into a choice of multiple grooves in the base of the tray. A model that would also provide for personal protection against armed threat ballistic attacks would substitute a rated threat level ballistic protection shield cushion for the comfort cushion. The rated threat level ballistic shielding could be of KEVLAR by Du Pont (nylon thread) such as is used by law enforcement forces for personal armed threat body shielding protection.

To use the invention, the operator simply places the computer into the tray and places the invention either on their lap, workstation or other convenient place, a strap or VELCRO (hook and loop fastener) strips to hold the computer into the device for carrying can be attached. The grounding wire is attached to the electro-magnetic shielding connection on one end and the other end is plugged into the grounding opening of a convenient electric outlet, where there is no convenient electric outlet the grounding wire with the clamp on one end can be clamped to any other convenient fixture that will serve as a ground. To use the model of the invention that substitutes the ballistic protection shielding cushion for the standard comfort cushion, in addition to all the features of the other models, this model offers the additional protection against an armed threat. In the event of such an emergency, the operator simply lifts the invention and holds it in front of the line of passage of the bullet. The ballistic shielding of the various class levels are all compatible with this model of the invention. The Ballistic Shielding model can be used in a carrying case with or without a computer and provide a level of protection against a terrorist attack. There have been many cases of automobile highjacking where the driver is threatened with a gun. Using this device, either alone or in a briefcase, may protect the driver against bodily harm and also save the theft of the automobile. Also, this model of the invention would provide the same type of protection police officers use as body bullet shields. An advantage of this model would be that in the event of an armed threat its use could prevent what would otherwise have lead to rape, kidnapping, robbery or bodily harm.

It will be understood that the above drawings illustrate merely a preferred embodiment of the invention and that other embodiments are contemplated within the scope of the claims hereafter set forth.

DESCRIPTION OF THE PREFERRED EMBODIMENTS

There are various models of the invention to suit the needs of the consumer and to conform to the computer. The computers are made by many manufacturers and come in different sizes and provide for many accessories. To accommodate the variety of users and their purposes it is necessary to provide various models, from a simple low cost standard model FIG. 2 to models more adaptable to computer modifications FIGS. 3,4, 5,6 and 7.

The parts of the invention as described in the drawings are the tray walls 5, the tray base 6, the cushion 7, the electro-magnetic radiation shielding 8, the bending or removable side walls 9, the side walls with plugs 10, the grounding connection 11, the grounding wire 12, the grounding wire connecting plugs 13, the grounding wire clamps 14, the VELCRO straps (hook and loop fasteners) 15. The side wall plugs 16, the rated armed threat level ballistic protection shield cushion 19.

Figure 1:
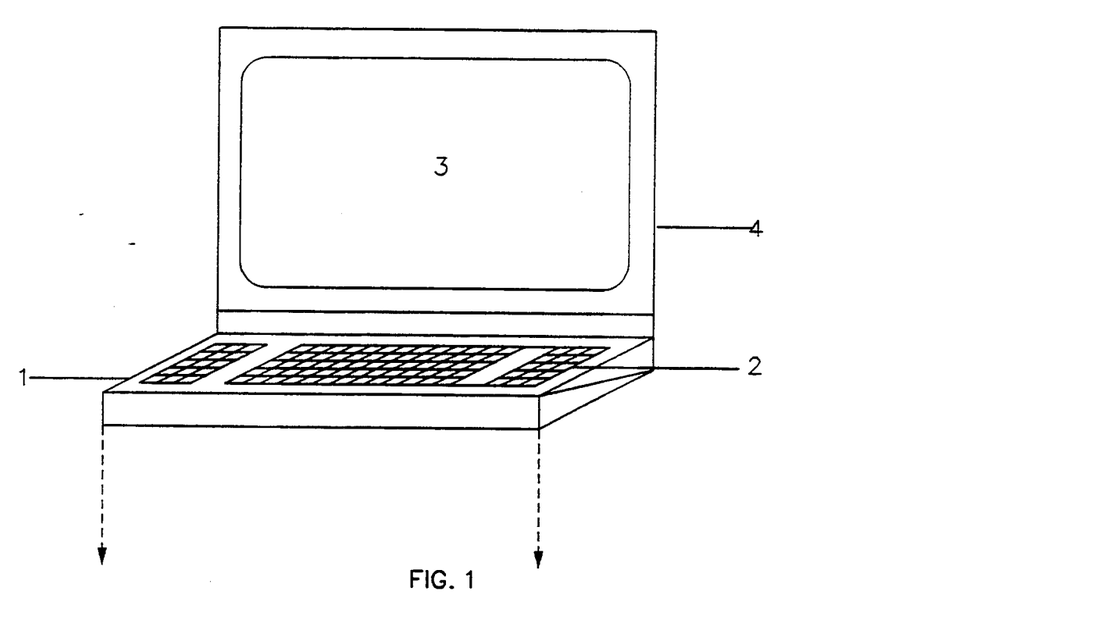
FIG. 1 is a 3 dimensional drawing of a lap-top computer.
Figure 2:
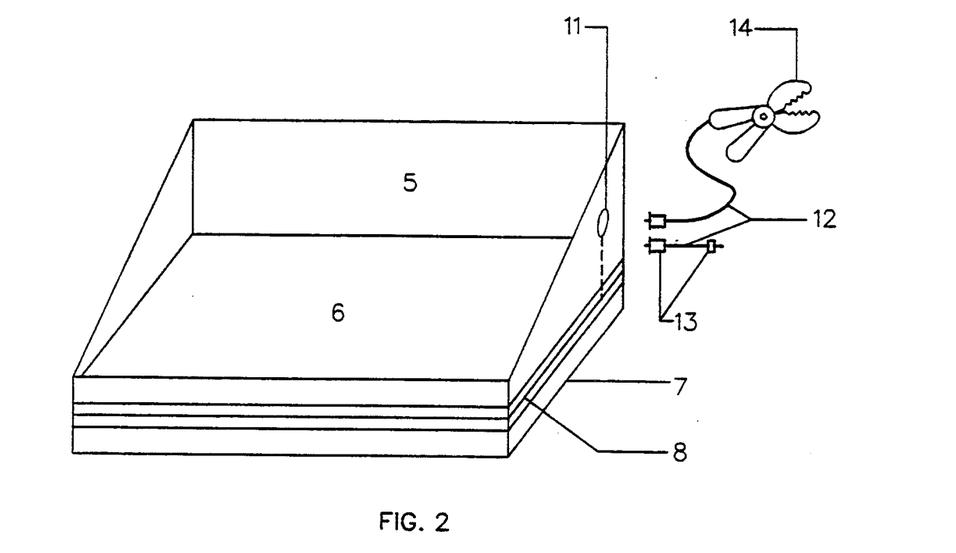
FIG. 2 shows a 3 dimensional model of the invention that points out the tray, the sloping walls, the rear wall higher than the front wall, the electro-magnetic radiation shielding between the cushion and the tray, the cushion, the grounding connection and the grounding wire, plugs and clamp.

To make the FIG. 2 model of the invention, a tray 5,6 is formed from a plastic, metal or other firm solid material. The walls 5 are sloped forward on the sides, the front wall is lower than the back wall. It is made into one piece with the tray 6 to form an open case. Electro-magnetic shielding 8 is attached under the bottom of the case 6 and the cushion 7 is attached to the electro-magnetic shielding 8 and fastened through to the case to hold it in place as a unit. A grounding connection 11 is attached to the electro-magnetic shielding 8 to accommodate the grounding wire 12, plugs 13 and clamp 14.

The computer is placed into the invention, the grounding wire is connected to the case on one end and is grounded into the ground connection of an electric socket with the plug or onto a grounded fixture with the clamp. The VELCRO straps 15 can be affixed to the computer and the case to hold the computer in place when transporting it.

Figure 3:
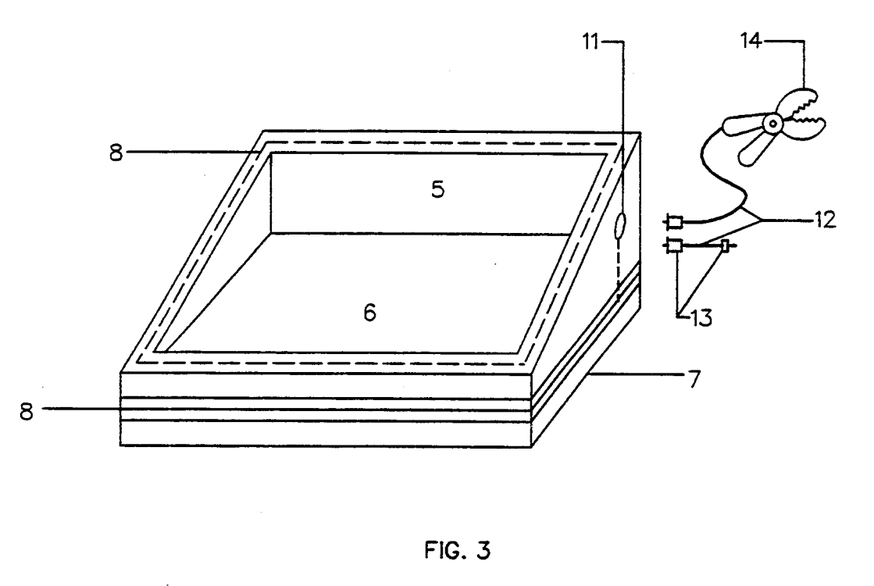
FIG. 3 shows a 3 dimensional model of the invention that is similar to FIG. 2, the difference being that the electro-magnetic radiation shielding is also added between the upright walls and the upright walls are doubled.

To make the FIG. 3 model of the invention, the same procedure as the FIG. 2 model is required except that double walls 5 are added and the electro-magnetic radiation shielding 8 is extended from the bottom of the tray upward and between the double walls 5 to protect the electro-magnetic radiation shielding 8 from damage and to extend the electro-magnetic radiation shielding protection to the walls 5.

Figure 4:
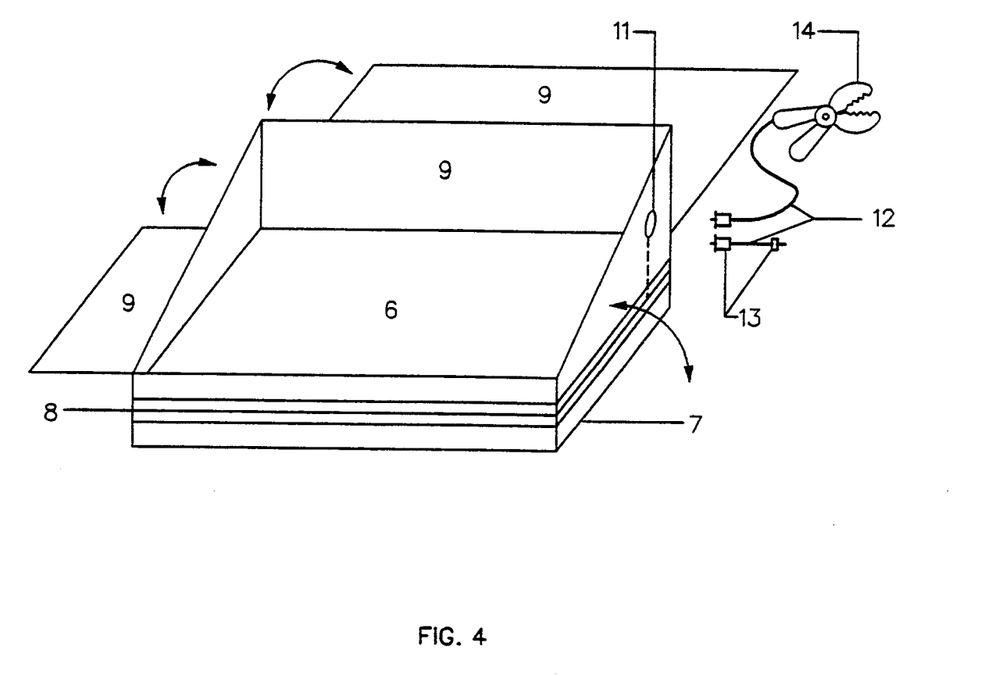
FIG. 4 shows a 3 dimensional model of the invention that has folding walls.

To make the FIG. 4 model of the invention, the same procedure as the FIG. 2 or FIG. 3 model is required except that the side walls 9 are hinged at the base of the walls to provide bending of the walls. This will provide access to the sides of the computer. It will also facilitate storage of the invention by flattening the sides to reduce the height of the invention.

Figure 5:
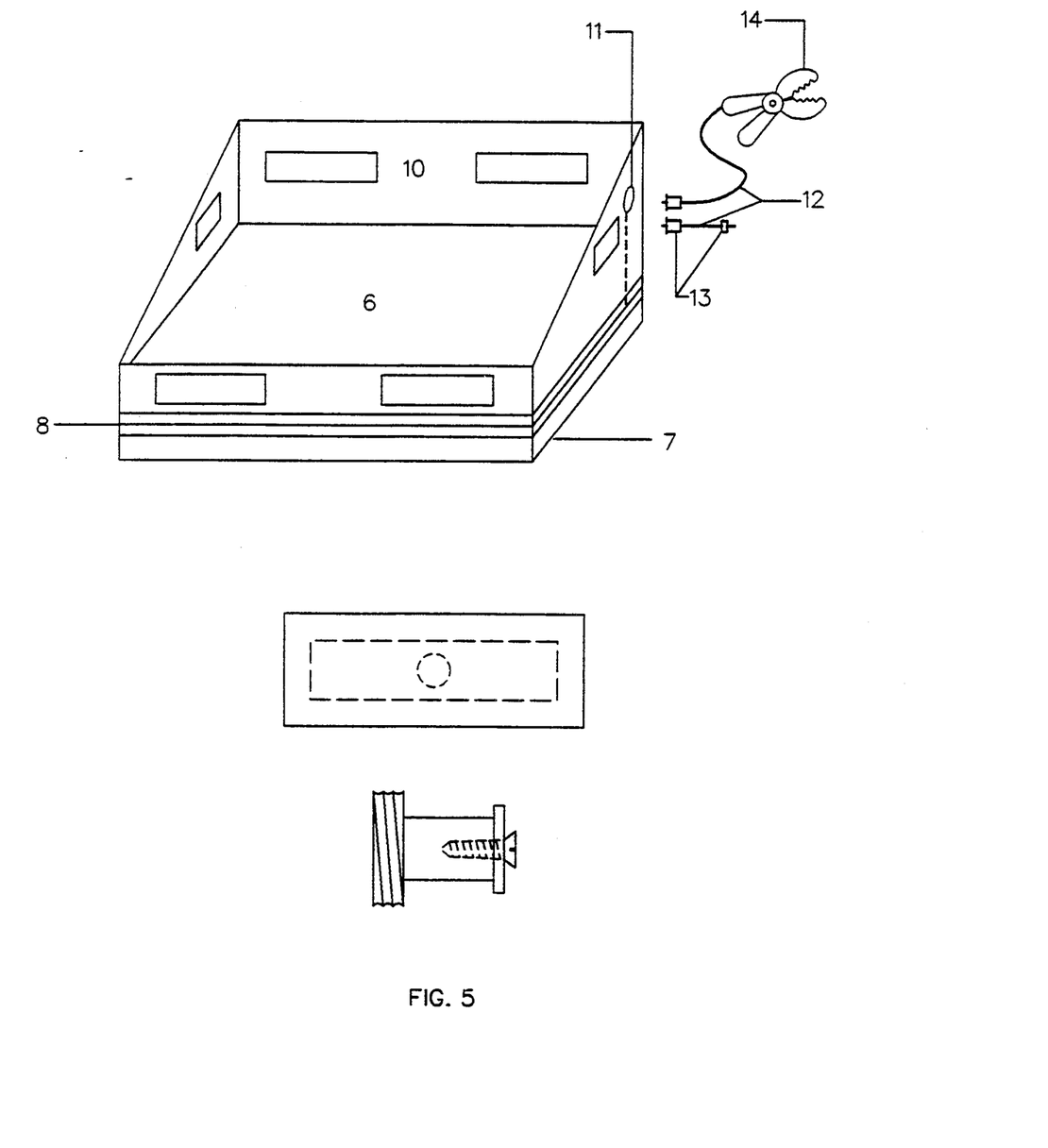
FIG. 5 shows a 3 dimensional model of the invention that shows walls with openings that have removable plugs.

To make the FIG. 5 model of the invention, the same procedure as the FIG. 2 or FIG. 3 or FIG. 4 model is required except that the side walls 10 have openings with removable plugs 16 to cover the openings.

Figure 6:
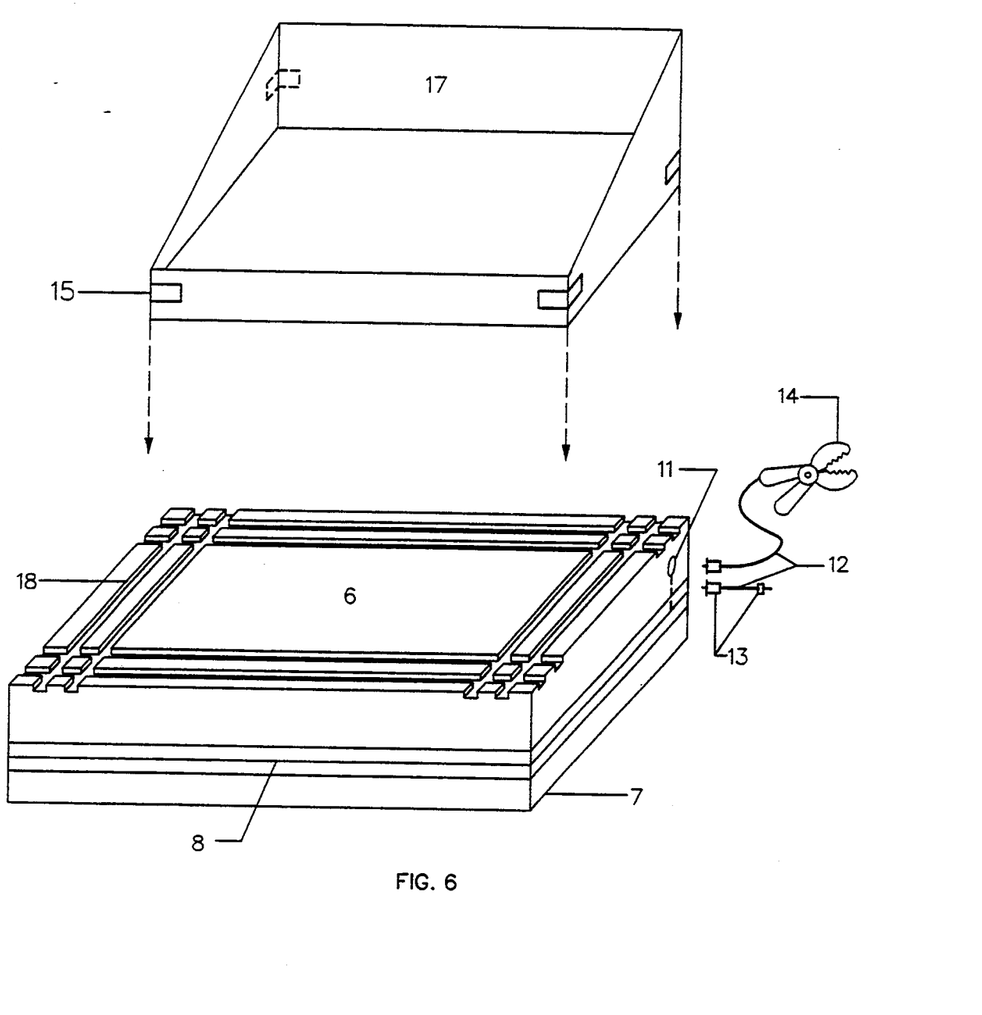
FIG. 6 shows a 3 dimensional model of the invention that shows removable sides.

To make the FIG. 6 model of the invention, the same procedure as the FIG. 2 or FIG. 3 or FIG. 5 model is required except that walls 5 or 10 can be varied in size by attaching sliding walls 17 for walls 5 or 10 and providing grooves 18 in the base of the tray 6 to accommodate the selected sizes.

Figure 7:
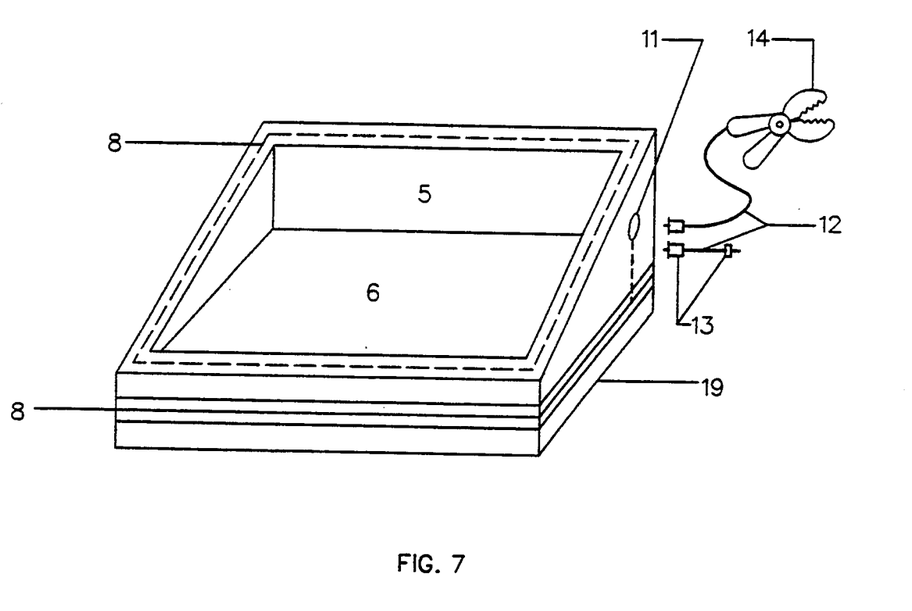
FIG. 7 shows a 3 dimensional model of the invention with a ballistic protection shield cushion substituted for the comfort cushion.

To make FIG. 7 model of the invention, the same procedure as FIG. 2 or FIG. 3 or FIG. 4 or FIG. 5 or FIG. 6 model is required except that the comfort cushion 7 is substituted by an armed threat rated ballistic protection shield cushion 19, the ballistic shield is made with sandwiched layers of 100% KEVLAR by Dupont (nylon thread) inserted into a protective jacket of ballistic cloth cover material to form a cushion. The amount of sandwiched layers will determine the class levels of threat protection in accordance with the U.S. Department of Justice (NIJ) 0108.01 Standard for ballistic materials. The ballistic protection shield cushion is fastened to the electro-magnetic radiation shielding under the bottom of the tray and to the tray to form a one piece unit.

This invention will serve to afford some protection to users of portable computers and Lap-top and Notebook computers from the dangers of electro-magnetic radiation emitted from the computer, from armed ballistic threat injury and provides a non-slip comfortable cushion when placed on a person's lap eliminating the need to cross legs to hold the computer. The practice of crossing of legs to hold the computer can effect the blood flow of the circulatory system thereby causing another bodily hazard. Also, when the computer is placed on desk, table or other work station the invention's cushion provides a non-slip and quieting effect of the computer's noise. Furthermore, in addition to all the previous noted benefits, the ballistic armed threat ballistic shielding provision of the invention is very much needed by travelling executives who are exposed to the terrorist actions in the world today, as well as computer operators dealing with the public in non-shielded environments. The travelling person simply puts their laptop or notebook computer into the invention, attaches holding straps and places it into a carry case as a unit. It is then concealed and portable and can be carried by a handle. In the event of an armed threat, the carry case with invention is instantaneously positioned against the body to face the armed threat as a shield. In addition to the travelling terrorist situations there have been many instances where a person is driving their automobile and stops for a traffic light. They are accosted by an attacker with a gun and ordered out of the car, robbed, raped or mugged and the car is taken by the attacker. They have no protection since if they fail to obey, the attacker can fire a gun through the windshield or driver's window. However, the invention, if available, would afford some protection in these cases since it would be simple to grab the carry case containing the invention, with or without the computer, hold it in front of the accoster and drive off without fear since the ballistic shield affords protection. The invention will provide the user with the same ballistic protection against handguns and shotguns that law enforcement has been using for years.

While various changes may be made in the detailed construction, such changes will be within the spirit and scope of the present invention, as defined by the appended claims.

I claim:

1. An assembly for diverting the passage of electromagnetic energy emitted from lap-top computers, notebook computers and portable computers, said assembly comprising:
   (a) a tray having a base with upright sides;
   (b) an electro-magnetic radiation shielding affixed under the base of the tray;
   (c) a horizontal cushion affixed to the electro-magnetic radiation shielding and the base of the tray;
   (d) a grounding connector being connected to the electro-magnetic radiation shielding;
   (e) wires with connectors that can be attached to said grounding connector to form a ground.

2. An assembly for diverting the passage of electromagnetic energy emitted from lap-top computers, notebook computers and portable computers, said assembly comprising:
   (a) a tray having a base and upright sides, said upright sides being double;
   (b) a first electro-magnetic radiation shielding affixed between the double sides;
   (c) a second electro-magnetic radiation shielding affixed under the base of the tray and connected with the first electro-magnetic radiation shielding;
   (d) a horizontal cushion affixed to both the electromagnetic radiation shielding and under the base of the tray;
   (e) a grounding connector being attached to the electro-magnetic radiation shielding;
   (f) wires with connectors that can be attached to said grounding connector to form a ground.

3. An assembly for diverting the passage of electromagnetic energy emitted from lap-top computers, notebook computers and portable computers, said assembly comprising:
   (a) a tray having a base with sides that bend at the base to permit attachment of accessories to the computer;
   (b) electro-magnetic radiation shielding attached under the base of the tray;
   (c) a horizontal cushion affixed to the electro-magnetic radiation shielding and under the base of the tray;
   (d) a grounding connector being attached to the electro-magnetic radiation shielding;
   (e) wires with connectors that can be attached to said grounding connector to form a ground;

4. An assembly for diverting the passage of electromagnetic energy emitted from lap-top computers, notebook computers and portable computers, said assembly comprising:
   (a) a tray having a base and upright sides;
   (b) the upright sides have spaced removable plugs to permit inserting accessories into the computer;
   (d) an electro-magnetic radiation shielding affixed below the base of the tray;
   (e) a horizontal cushion affixed to both the electromagnetic radiation shielding and under the base of the tray;
   (f) a grounding connector being attached to the electro-magnetic radiation shielding;
   (g) wires with connectors that can be attached to said grounding connector to form a ground.

5. An assembly for diverting the passage of electro-magnetic energy emitted from lap-top computers, notebook computers and portable computers, said assembly comprising:
   (a) a tray having a base and replaceable upright sides, said sides being enabled to be removed from grooves in the base and replaced with longer or shorter sides;
   (b) an electro-magnetic radiation shielding affixed under the base of the tray;
   (c) a horizontal cushion affixed to both the electro-magnetic radiation shielding and under the base of the tray;
   (d) a grounding connector being attached to the electro-magnetic radiation shielding;
   (e) wires with connectors that can be attached to said grounding connector to form a ground.

6. An assembly for diverting the passage of electro-magnetic energy from lap-top computers, notebook computers and portable computers with a rated threat level ballistic protection shield cushion comprising:
   (a) a tray having a base and upright walls;
   (b) an electro-magnetic radiation shielding affixed under the base of the tray;
   (c) an electro-magnetic radiation shielding affixed between the upright walls;
   (d) a horizontal protection shield cushion of rated threat level ballistic protection materials affixed to both the electro-magnetic radiation shielding and the bottom of the tray;
   (e) a grounding connector being attached to the electro-magnetic radiation shielding;
   (f) grounding wires being attached to the grounding connector to form a circuit.

* * * * *